United States Patent [19]
Sherrod

[11] 3,743,322
[45] July 3, 1973

[54] METHOD AND APPARATUS FOR TRANSPORTING LARGE MOBILE HOMES

[76] Inventor: James A. Sherrod, P.O. Box 217, Pavo, Ga. 31778

[22] Filed: Mar. 10, 1972

[21] Appl. No.: 233,421

[52] U.S. Cl............. 280/400, 280/150 C, 280/472, 296/23 R
[51] Int. Cl............................................ B62d 37/04
[58] Field of Search............... 280/150 E, 472, 409, 280/413, 400, 34 A, 29, 150 C, 106 T; 296/1 R, 23 R

[56] References Cited
UNITED STATES PATENTS
3,605,633   9/1971   Townsend.......................... 105/1 R
2,993,721   7/1961   Bowman........................... 280/150 E
1,571,319   2/1926   Byrne................................ 280/472

Primary Examiner—Leo Friaglia
Assistant Examiner—Randall Schrecengost
Attorney—B. P. Fishburne, Jr.

[57] ABSTRACT

A trailer or transporter for large mobile homes measuring up to 14 feet wide is equipped with a permanent or removable ballast means for shifting the normal center of gravity of the load with respect to the roadway, whereby the caravan is enabled to utilize roads as narrow as twenty feet wide without creating a dangerous traffic situation. A conventional hauling tractor can be employed.

6 Claims, 4 Drawing Figures

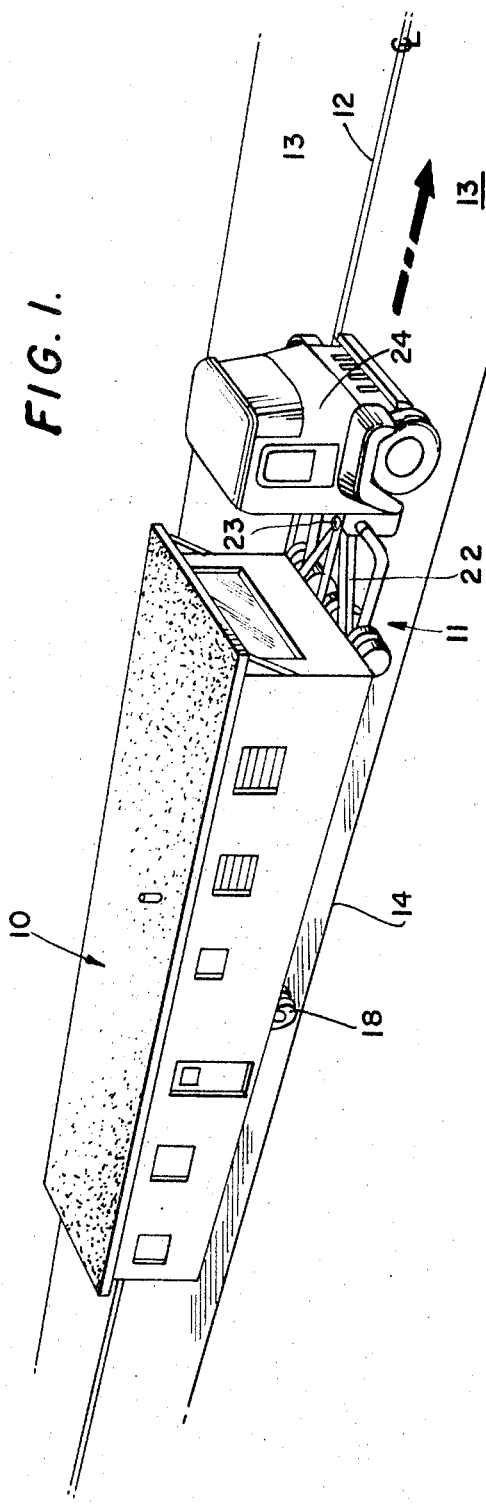
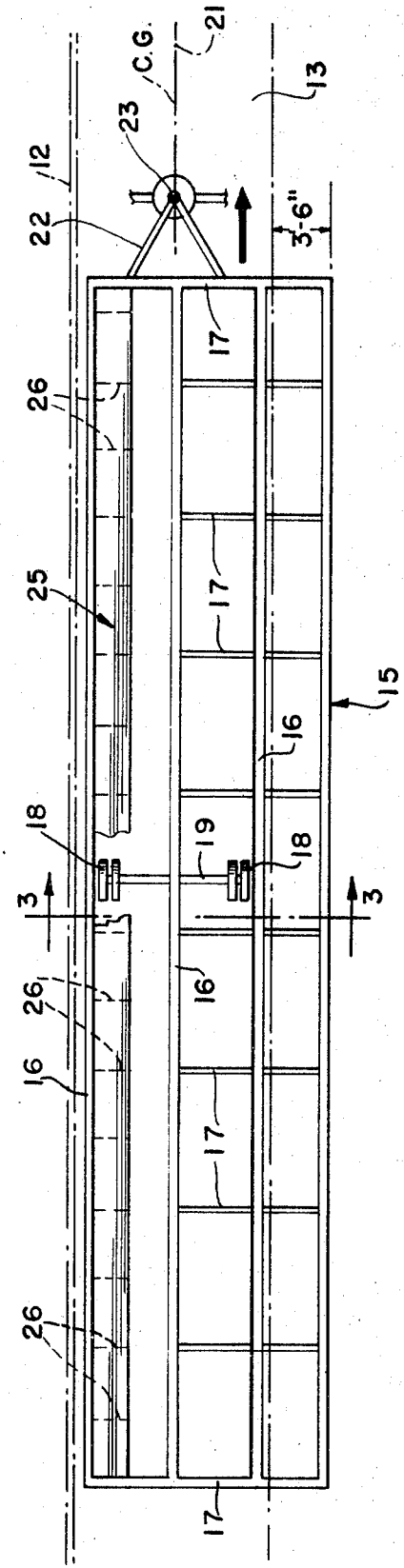

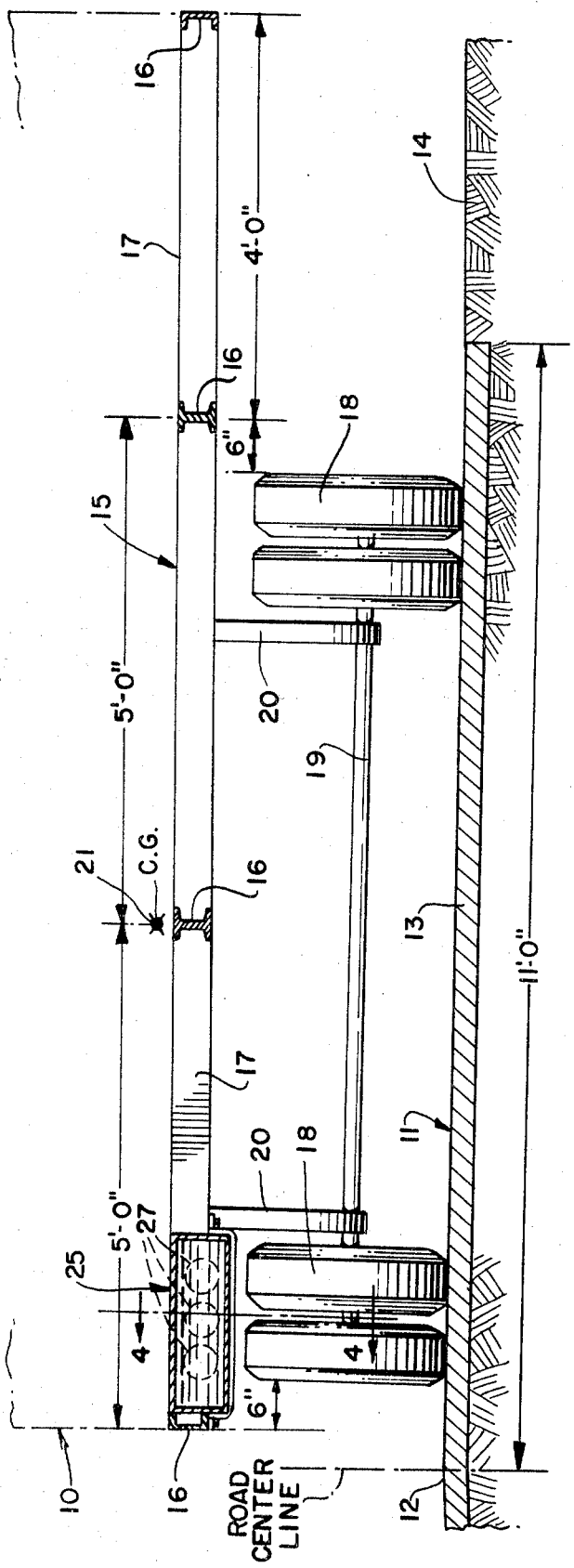

METHOD AND APPARATUS FOR TRANSPORTING LARGE MOBILE HOMES

BACKGROUND OF THE INVENTION

A serious problem has arisen in connection with the transporting of large size mobile homes on existing highways in various States. Some present day mobile homes measure 70 feet or more in length and up to 14 feet wide. They are commonly moved on highways by conventional trailer tractors or, in some cases, by specially designed towing vehicles. Many State highways encountered are only 20 or 22 feet wide between unpaved shoulders, leaving a usable runway of 11 feet on each side of the roadway center line. Since such two lane highways are usually provided with considerable crowning causing the pavement to slope in opposite directions from the center line toward the shoulders of the road, a rather unstable condition is created when an attempt is made to tow the wide mobile homes of the class in question. In a growing number of States, laws prohibit the movement of large mobile homes over State highways of the 20 or 22 foot wide class. In other States where such traffic is permitted, a dangerous traffic hazard usually results from the movement of mobile homes. In order to stabilize the caravan, the driver of the towing vehicle will frequently drive in such a manner that the mobile home will extend considerably over the road center line, thus encroaching dangerously on the opposite lane, sometimes causing oncoming drivers to move off of the pavement or risk a collision. In other cases, the caravan driver will attempt to run the mobile home trailer wheels dangerously close to the edge of the pavement risking involvement with the adjacent upaved shoulder. If the trailer wheels move onto a muddy shoulder at high speed, an upset or serious accident is almost inevitable. This hazard is compounded by the crowned slope of the roadway causing the heavy trailer to tilt toward the outside edge of the road. Additionally, the instability of the long caravan and its tendency to sway during high speed movement is another well known hazard, compounding the problem.

In light of the above, a method and apparatus has been created to allow relatively safe movement of large mobile homes on highways of the 20–22 foot class. According to the invention, a transporter or trailer has been constructed with a ballast or weight along one side of the same which has the result of effectively shifting the center of gravity of the loaded trailer a considerable distance toward the center of the roadway or toward the inner side of the vehicle in relation to its normal movement direction on the roadway. The shifting of the center of gravity not only compensates for the crown slope in the roadway, tending to level the trailer, but additionally allows the outer side of the wide mobile home to extend over the unpaved shoulder as much as four feet thus preventing the caravan from extending over the road center line and allowing the dual wheels of the trailer to be safely centered on one lane of the roadway with adequate clearance relative to the road shoulder. The ballast means for the trailer causing the desired shift in center of gravity may be in many forms and may be fixed or adjustable, permanent or removable, as found desirable to meet the needs of particular situations. The tractor or towing vehicle is coupled to the draft tongue of the mobile home trailer at a point coinciding with the off-center or shifted center of gravity to further increase the stability of the caravan.

Other features and advantages of the invention will become apparent during the course of the following detailed description.

BRIEF DESCRIPTION OF DRAWING FIGURES

FIG. 1 is a perspective view depicting the movement of a mobile home along a two lane State highway or the like.

FIG. 2 is a partly diagrammatic plan view of the transporting caravan with the mobile home body removed to expose the trailer structure to view.

FIG. 3 is an enlarged transverse vertical section taken on line 3—3 of FIG. 2.

FIG. 4 is a fragmentary vertical section taken on line 4—4 of FIG. 2.

DETAILED DESCRIPTION

Referring to the drawings in detail, the numeral 10 designates a large mobile home having a width of 14 feet and a length of as much as 70 feet, the other details of construction of the home being immaterial to a full understanding of the invention. In the drawings, the mobile home is depicted in relation to a 22 foot wide road or highway 11 having a center line stripe 12 dividing the roadway into two equal width lanes 13, each 11 feet wide. The longitudinal edges of the highway 11 are bounded by shoulders 14, such as unpaved dirt shoulders. As shown in FIG. 3, the road or highway 11 has a customary degree of crowning so that each paved portion or lane 13 slopes downwardly on a gentle slope from the center line toward the opposite road shoulders. The above is a description of a typical primary State highway, and the description also fits many existing Federal two-lane highways, as distinguished from divided highways and turnpikes having a median strip and two or more paved traffic lanes on opposite sides thereof.

The mobile home 10 according to the invention is transported on a low elevation elongated flat bed trailer 15 usually constructed as a framework of heavy welded bars or beams so that the structure will be sufficiently rigid. The details of construction may vary and are unimportant in connection with the present invention. As illustrated, the trailer 15 has a suitable number of spaced longitudinal members 16 and crossing transverse members or bars 17, all joined by welding or the like to produce a rigid structure. The wheeled running gear of the trailer bed 15 may also vary in detail and is illustrated in the present embodiment to comprise a pair of dual wheels 18 carried by an axle 19 near the longitudinal center of the trailer bed and connected with the bed by any conventional suspension 20, the details of which are omitted.

As depicted in the drawings, the overall width of the trailer bed 15 is 14 feet and equal to the width of the mobile home 10. All dimensions specified herein are for the purpose of illustration and explanation and are not to be taken as being critical or in a limiting sense. The dimensions can be varied somewhat in accordance with variations of roadway width and/or mobile home width, but the principles of the invention apply in the same way to all sizes. The mobile home 10 is firmly seated centrally on the trailer bed 15 and safely anchored thereto for transporting in any conventional manner so as to allow separation of the home from the trailer at a chosen permanent site or the like.

In accordance with the invention, the center of gravity of the loaded trailer 15 is shifted a significant distance, such as two feet, away from the transverse center of the trailer in a direction toward the center of the roadway. The shifted center of gravity indicated at 21 in FIG. 3 can be made to coincide with the adjacent longitudinal frame member 16 although this is not an absolute requirement. The trailer wheels 18 are centered with respect to the shifted center of gravity 21 and are not symmetrical with the trailer bed 15 but instead, like the center of gravity, are offset toward the center of the roadway. The wheels 18 which span a total distance of nine feet in the illustrated embodiment can be approximately centered on the road lane 13, as shown. The draft tongue 22 at the forward end of the trailer bed 15 is also centered with respect to the center of gravity 21 and is therefore off-center from the true center line of the trailer bed. The hitch or coupling point 23 with the towing vehicle 24 is coincident with a line through the center of gravity as clearly shown in FIG. 2 so that the pull exerted by the towing vehicle is along or through the center of gravity. As best shown in FIG. 3, the side of the trailer bed remote from the center line 12 of the roadway is allowed to project some four feet six inches outwardly from the outside wheel 18 and consequently the trailer bed and the mobile home may overhang the shoulder 14 by as much as 4 feet with relative safety and still leaving a safe running space on the pavement for the outside wheels 18. Under these conditions, the inside of the trailer bed and mobile home are positioned safely on the right hand side of the roadway with no projection onto or over the center line 12.

Means for producing the required lateral shifting of the center of gravity of the vehicle comprises in the embodiment shown a shallow rectangular hollow ballast compartment 25, located immediately above the inside dual wheels 18 and preferably extending along the entire length of the trailer bed 15. The ballast compartment 25 is in the nature of an elongated tank, rectangular in cross section, and suitably rigidly anchored to the framework of the bed 15, preferably inwardly of the adjacent inside longitudinal member 16, FIG. 3. The ballast compartment or tank 25 preferably contains a plurality of equidistantly spaced internal cross baffles 26 having restricted ports 27 formed therethrough. This structure renders it feasible to employ a liquid ballast, such as water, in the tank 25 and the presence of the baffles 26 will arrest movement and sloshing of the water so as to preserve stability, as when the caravan is braked or accelerated.

In lieu of the elongated liquid ballast tank, a compartmented holder for sand, gravel or sectional solid weights in the same location as the tank may be provided. The liquid tank is provided with suitable filling and drain ports, not shown, so that the volume of liquid and consequently the weight of the ballast can be adjusted. Other alternative ballast arrangements are feasible including the use of collapsible liquid filled containers at intervals along the same side of the trailer. Such containers could be cone-shaped with their larger ends arranged lowermost and provided with non-skid material so tha the containers will not tend to shift. While a variety of ballast schemes can be utilized, the principle of shifting the center of gravity remains the same in all cases and the liquid ballast tank arrangement shown in the drawings is one of the simplest and most practical means of accomplishing the desired purpose.

As shown in FIG. 3, the ballast in the tank 25 counterbalances the opposite side overhanging portion of the mobile home and trailer and also serves to keep the trailer relatively level to compensate for the lateral slope of the pavement 13. This, in turn, renders the caravan stable and safe and the dangerous condition usually encountered with wide mobile homes is entirely eliminated, as should now be apparent to anyone skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of transporting a large mobile home on a roadway of restricted width comprising towing a mobile home along said roadway while supporting the home on a wheeled trailer and with the wheels of said trailer safely positioned within the boundaries of the roadway, causing one side portion of the mobile home to project outwardly beyond the outer boundary of the roadway in substantial overhanging relationship to an adjacent unpaved roadway shoulder during said transporting in laterally unbalanced relationship to the wheeled trailer, counterbalancing the trailer near its side opposite to the overhanging portion of the mobile home to level and stabilize the trailer and mobile home and to effectively establish the center of gravity of the trailer and mobile home midway between the wheels of the trailer and near the center of the usable portion of the roadway, and applying the pulling force to tow the trailer and mobile home at the front of the trailer at a point aligned with the center of gravity of the trailer.

2. A transporting caravan for a large mobile home comprising a wheeled flat bed trailer adapted to support a large mobile home, the bed of said trailer being non-symmetrical with respect to the wheel base of the trailer and one side of the bed projecting for a substantial distance laterally outwardly on one side of the wheel base, the opposite side of the bed terminating near the other side of the wheel base, a counterbalancing weight means on the trailer bed near said other side and opposite to the projecting side of the bed and serving to stabilize and level the bed when the latter is supporting the mobile home having the same overall width as the bed, the center of gravity of the counterbalanced bed being substantially midway between the wheels of said wheel base and symmetrical with the wheel base, and a draft tongue for said trailer anchored to the trailer bed in coincidence with the center of gravity of the bed and in offset relationship toward the side of the bed remote from said projecting portion so that a towing force may be applied to the counterbalanced trailer along its true center of gravity.

3. The structure of claim 2, and a towing vehicle coupled to said draft tongue of the trailer, the towing vehicle being substantially centered between the boundaries of a roadway on which the mobile home is being transported.

4. The structure of claim 2, and the counterbalancing weight means comprising an elongated shallow weight means secured to the trailer bed along its side remote from said projecting portion and extending substantially for the full length of the bed above one set of wheels of said wheel base.

5. The structure of claim 4, and said weight means comprising a liquid tank having a series of transverse apertured divider walls therein at equally spaced intervals along its length.

6. The structure of claim 5, and said tank being rectangular in cross section and being vertically shallow and relatively wide so as to fit a relatively restricted space between said wheel base and the floor of the mobile home being transported.

* * * * *